United States Patent [19]

Davis et al.

[11] 4,231,645
[45] Nov. 4, 1980

[54] CAMERA WITH TELESCOPING DUAL ACTUATORS

[75] Inventors: Carl W. Davis, Lynnfield; Joseph E. Murray, Jr., Malden, both of Mass.

[73] Assignee: Polaroid Corporation, Cambridge, Mass.

[21] Appl. No.: 54,652

[22] Filed: Jul. 3, 1979

[51] Int. Cl.³ .............. G03B 15/05; G03B 17/04; G03B 17/38; H01H 9/26
[52] U.S. Cl. .............. 354/145; 354/187; 354/266; 200/1 B; 200/5 R; 200/16 R; 200/153 LA
[58] Field of Search ........ 354/126, 145, 288, 266–267, 354/187; 200/1 B, 5 R, 16 R, 153 LA, 159 A

[56] References Cited

U.S. PATENT DOCUMENTS

| | | | |
|---|---|---|---|
| Re. 27,362 | 5/1972 | Olson | 354/82 |
| Re. 29,764 | 9/1978 | Stoneham | 354/145 |
| 2,011,895 | 8/1935 | Goldhammer | 354/187 |
| 2,783,696 | 3/1957 | Sewig | 354/126 |
| 2,909,625 | 10/1959 | Moorman | 200/1 B X |
| 3,427,943 | 2/1969 | Leibundgut | 354/268 |
| 3,550,513 | 12/1970 | Johnson et al. | 354/268 |
| 3,599,548 | 8/1971 | Hennig | 354/266 X |
| 3,603,228 | 9/1971 | Kremp | 354/266 |
| 3,643,567 | 2/1972 | Douglas | 354/187 |
| 3,903,408 | 3/1976 | Taguchi | 354/266 X |
| 3,918,020 | 11/1975 | DuRocher | 200/153 LA X |
| 4,001,640 | 1/1977 | Biber | 315/241 P |
| 4,040,072 | 8/1977 | Johnson et al. | 354/173 |
| 4,084,167 | 4/1978 | Iwata | 354/145 X |
| 4,085,414 | 4/1978 | Burgarella et al. | 354/145 |
| 4,106,037 | 8/1978 | Nakamura et al. | 354/145 X |
| 4,132,471 | 1/1979 | Svatek et al. | 354/186 |

*Primary Examiner*—Joseph W. Hartary
*Assistant Examiner*—Thomas H. Tarcza
*Attorney, Agent, or Firm*—John S. Vale

[57] ABSTRACT

In a camera having a folding electronic flash unit, an improved dual actuator system for sequentially closing a flash charge switch to charge the flash unit's storage capacitor and operating a slider member that closes an internal switch to initiate an automatic cycle of camera operation. A charge switch actuator and slider actuator are mounted in telescoping relation for sequential operation with provisions made for optional independent operation of the slider actuator to bypass charging and operation of the flash unit. When the flash unit is folded, a detent thereon latches the charge switch actuator to inhibit inadvertent operation.

9 Claims, 10 Drawing Figures

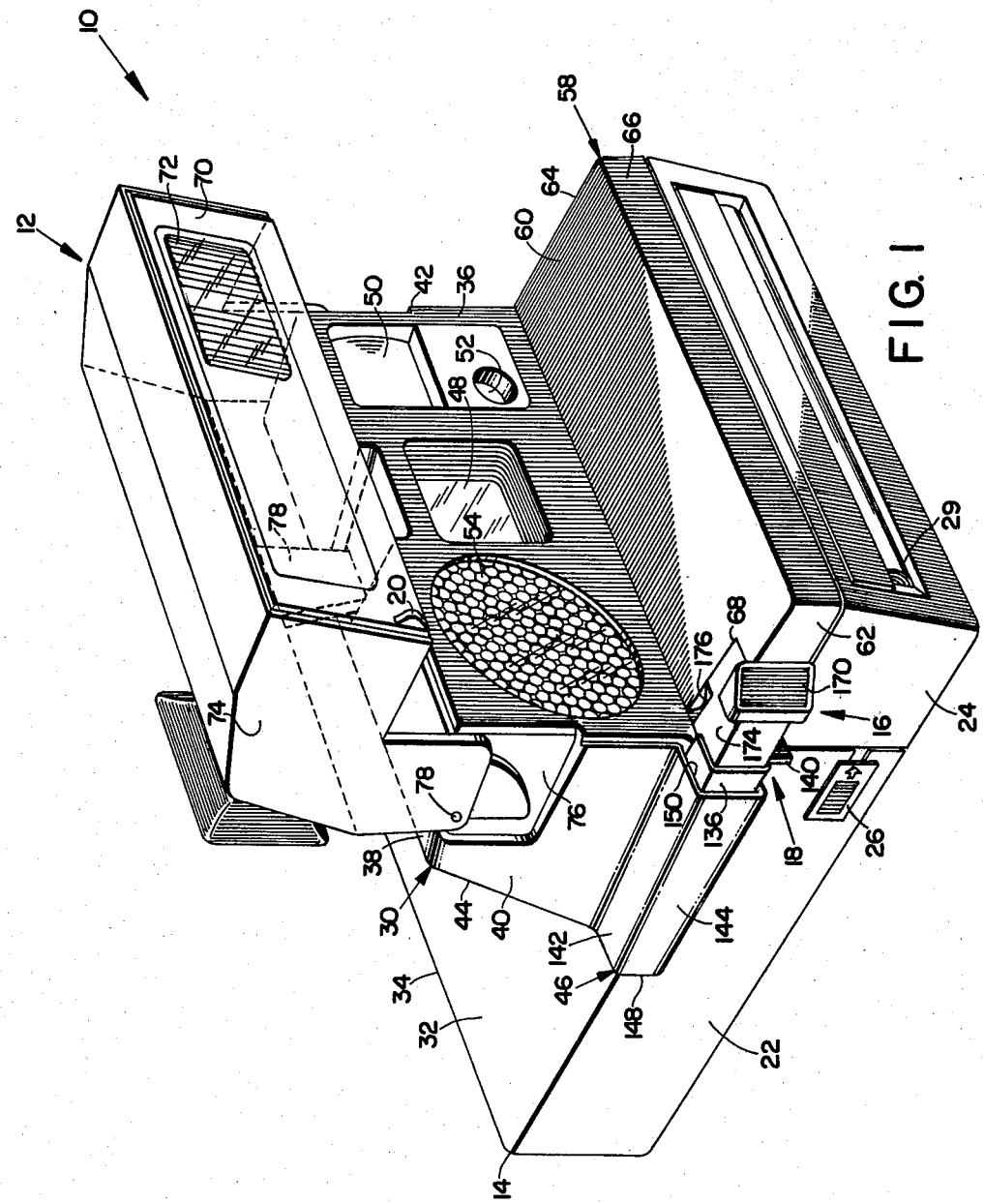

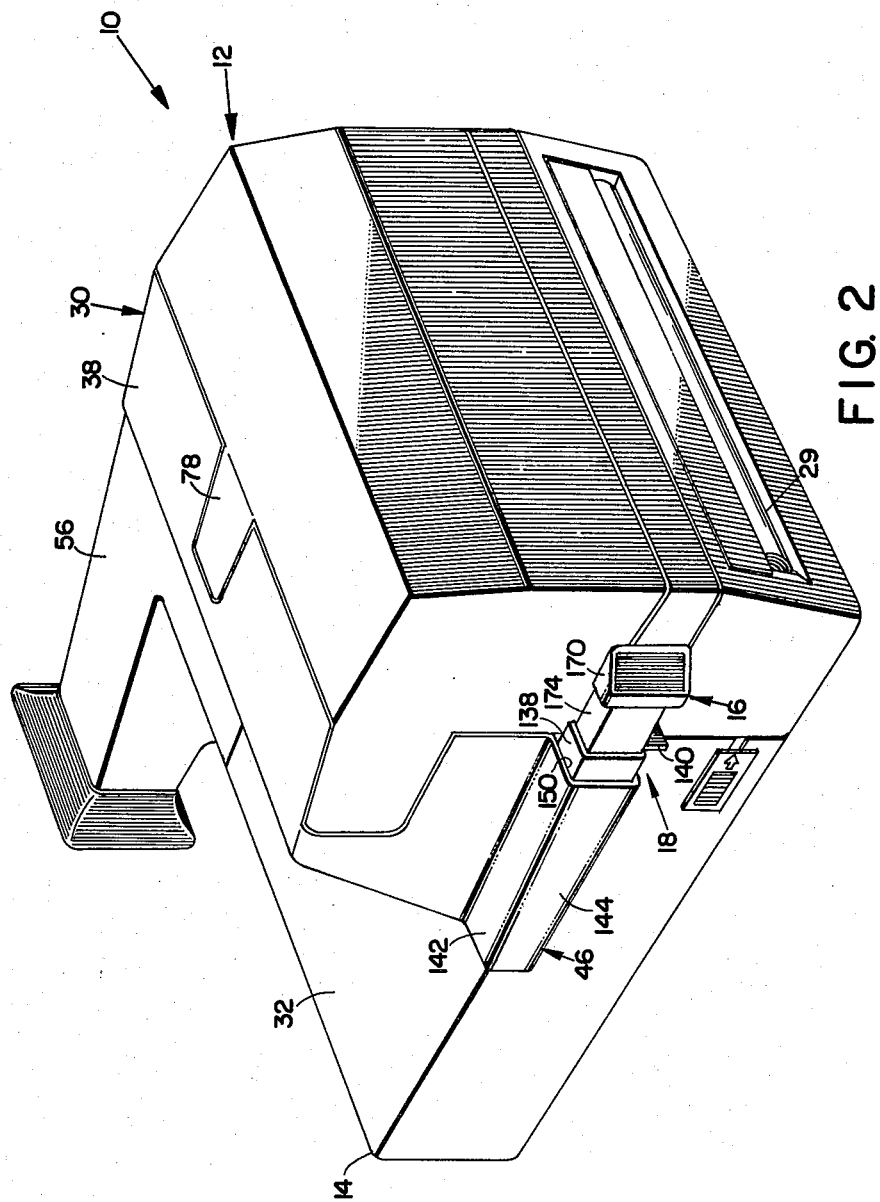

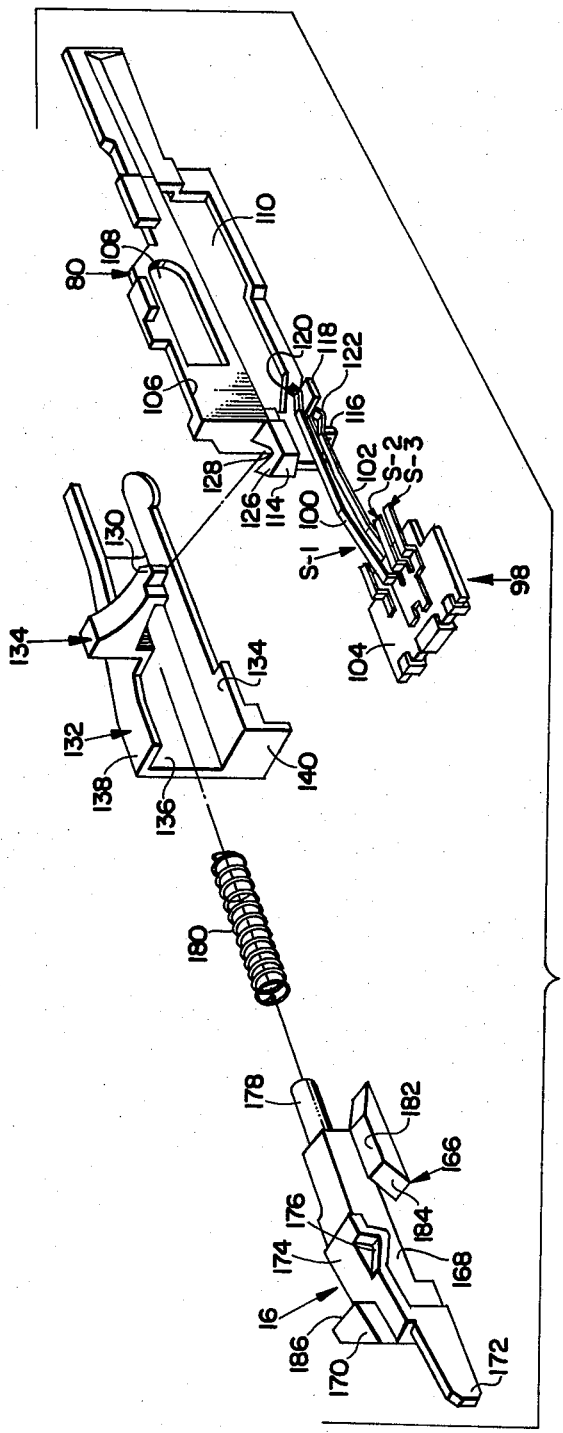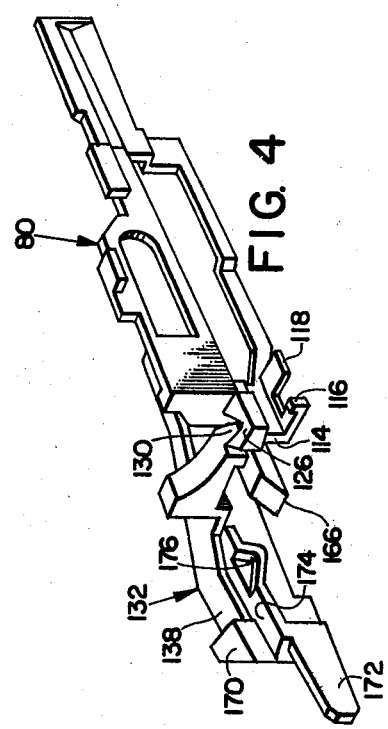

CAMERA WITH TELESCOPING DUAL ACTUATORS

BACKGROUND OF THE INVENTION

1. Field of the Invention

The present invention is directed to the field of photography and, more specifically, to improvements in cameras having a built-in electronic flash unit and manually operable first and second actuators for sequentially charging the flash unit's storage capacitor and then initiating an automatic cycle of camera operation.

2. Description of the Prior Art

The present invention is directed to improvements in a camera of the type disclosed in a commonly-assigned copending application, Ser. No. 054,598 entitled "Camera With Folding Flash Unit" filed by Bruce K. Johnson and George D. Whiteside on July 3, 1979. This camera includes a built-in electronic or strobe-type flash unit that is movable relative to the camera housing between an erect operative position and a folded storage position. The camera is preferably of the self-developing type which utilizes a film pack having a flat battery therein for powering the flash unit and the camera's electrical system. In order to prevent exceeding the battery's power delivery rate and to minimize power drain, it is preferable to provide a sequential actuating system wherein the flash unit's storage capacitor is charged to full capacity immediately preceding the film exposure and processing phase.

To provide this sequential actuating system, the camera disclosed in the above-noted copending application includes an elongated actuator housing, on one side of the camera, having a rearwardly facing first actuator or push button at the trailing end and a forwardly facing second actuator or push button at the leading end. In use, the first actuator is pushed forwardly to cause an internal electrical switch to be closed thereby connecting the battery in the film pack to the flash unit for capacitor charging. When the capacitor is fully charged, as indicated by a visual signal in the viewfinder, the user then pushes rearwardly on the second actuator to mechanically move a slider member located totally within the camera housing, which is effective to close an internal electrical switch that initiates an automatic cycle of camera operation including film exposure with supplemental illumination provided by the flash unit.

While this system works well, it does have several limitations. First, it is somewhat awkward for the user not to push rearwardly on the forward cycle actuator button with his second finger during the time period when he is pushing forwardly with his thumb on the rearwardly facing flash charge actuator. Secondly, in anticipation of the user inadvertently operating the actuators in the wrong sequence, it may be necessary to provide an additional logic circuit to electrically block out a camera start signal produced by operation of the forward actuator until the flash unit capacitor is fully charged. Once this lock-out logic is built into the system, the user is denied the option of initiating an automatic cycle of camera operation that does not include the firing of the flash unit when scene lighting conditions so warrant. Also, no provision is made for inhibiting operation of the flash charge actuator when the camera is not in use which could possibly cause excessive battery drain if the camera is stored under certain conditions, such as in a packed suitcase, where the flash charge actuator is inadvertently and unknowingly pushed forward.

Therefore, it is an object of the present invention to provide such a camera having an improved dual actuator system that eliminates the awkwardness and confusion of the forward and aft placement of the first and second actuators.

It is another object of the invention to provide a dual actuator system that has provisions for allowing the user the option of bypassing the flash charge phase and directly initiating an automatic cycle of camera operation that does not include firing the flash unit.

The internal slider member, responsive to operation of the second actuator for closing a normally open cycle start switch, has proven to be an extremely reliable device in the Pronto! and OneStep cameras manufactured by Polaroid Corporation, Cambridge, Massachusetts.

Therefore, it is yet another object of the present invention to provide an improved dual actuator system that retains such a slider.

Another object of the invention is to provide an improved dual actuator system which includes provisions for latching at least one of the actuators, preferably the flash charge actuator, to prevent inadvertent operation of the actuator when the flash unit is located in its folded storage position.

The slider device mentioned above and its associated switching system is of the type set forth in detail in commonly-assigned U.S. Pat. No. 4,040,072.

For representative examples of other self-developing cameras having dual actuators for flash charge and exposure initiation, reference may be had to commonly-assigned U.S. Pat. Nos. 4,001,640 and 4,085,414. It will be noted, however, that the placement of these dual actuators makes them somewhat awkward to use and the structure therein is not compatible with retaining the slider member.

The concept of latching or covering one or more camera actuators to prevent inadvertent operation of the camera when not in use is, of course, well known in the prior art. For example, commonly-assigned U.S. Pat. No. 3,550,513 shows a shutter actuator button that is movable between operative and latched positions. U.S. Pat. No. 2,783,696 shows, in FIG. 11, a camera wherein the actuating button is covered by an extension cover section on a folding flash unit. U.S. Pat. No. 3,427,943 discloses a camera in which a lens cover located in its closed position releasably latches a camera actuator. Also, U.S. Pat. No. 2,011,895 shows a detent on an erecting link that latches the camera actuator when the lens board is folded. Further, U.S. Pat. No. Re 27,362 discloses a camera having an actuator in a handle that is movable to a folded position wherein the actuator is inaccessible. For an example of a camera having a telescoping body that covers and denies access to the actuator button when the body is in its retracted position, see commonly-assigned U.S. Pat. No. 4,132,471.

SUMMARY OF THE INVENTION

The present invention is directed to an improved dual actuator system for a camera of the type having a electronic flash unit and including a camera housing, means operable upon actuation for initiating an automatic cycle of camera operation including film exposure, a slider mounted within the housing for movement along a first path of travel between a first position and a second position where the slider actuates the cycle initiating means, means for normally biasing the slider towards the first position, and a charge control circuit responsive to operation of a charge control switch for electrically connecting the flash unit to a source of electrical power for charging the flash unit's storage capacitor. More specifically, the improvement includes a manually operable charge switch actuator mounted for movement between an inoperative first position and sequential operative second and third positions, all disposed along a second path of travel that is offset in substantially parallel relation to the slider first path of travel, and including a plunger section having a switch actuating cam thereon and a button section that is manually accessible on the exterior of the housing. The improvement also includes means for biasing the switch actuator for automatic return to the first position upon manual release, means for mounting the charge control switch in position to be operated by the switch actuating cam, and a slider actuator for moving the slider from the first position to the second position to initiate a cycle of camera operation. The slider actuator is coupled to the slider for simultaneous movement therewith and includes an offset body section extending into the second path of travel in position to be engaged and moved by the switch actuator to effect slider operation during manual movement of the switch actuator from its second to its third position thereby effecting sequential operation whereby the flash unit is charged before the automatic cycle of operation is initiated.

In a preferred embodiment, the switch actuator and slider actuator are assembled in telescoping relation so that the switch actuator moves relative to the slider actuator during initial movement to close the flash charge switch and thereafter engages the slider actuator and carries it therewith during movement from the second to third position of the switch actuator to effect slider operation.

In a preferred embodiment, the flash unit is mounted on the camera housing for movement between an erect operative position and a folded storage position wherein a portion of the flash unit housing overlies a section of the switch actuator, located in its first position, that is accessible on the exterior of the camera housing. In order to prevent movement of the switch actuator from its first position, the flash housing is provided with a detent that releasably engages the section of the switch actuator when the flash unit is folded to thereby prevent its rearward movement towards its second switch actuating position.

Advantageously, the switch actuator and slider actuator are configured so that the slider actuator may be manually moved, without moving the switch actuator, to effect slider operation thereby providing the user with the option of bypassing the charging of the flash unit and initiating an automatic cycle of camera operation during which the flash unit is not fired.

BRIEF DESCRIPTION OF THE DRAWINGS

For a fuller understanding of the nature and objects of the invention, reference should be had to the following detailed description taken on connection with the accompanying drawings wherein:

FIG. 1 is a left front perspective view of the improved camera embodying the present invention showing the flash unit in its erect position and the switch actuator and slider actuator in their respective first or ready positions;

FIG. 2 is a perspective view of the camera of FIG. 1 shown with the flash unit in its folded storage position;

FIG. 3 is a perspective view, shown in exploded fashion, of selected components of the improved dual actuator system along with a portion of the switch block located within the camera;

FIG. 4 is a perspective view of the slider, switch actuator, and slider actuator of FIG. 3 in an assembled state to show how they cooperate;

DESCRIPTION OF THE PREFERRED EMBODIMENT

Figure 5:
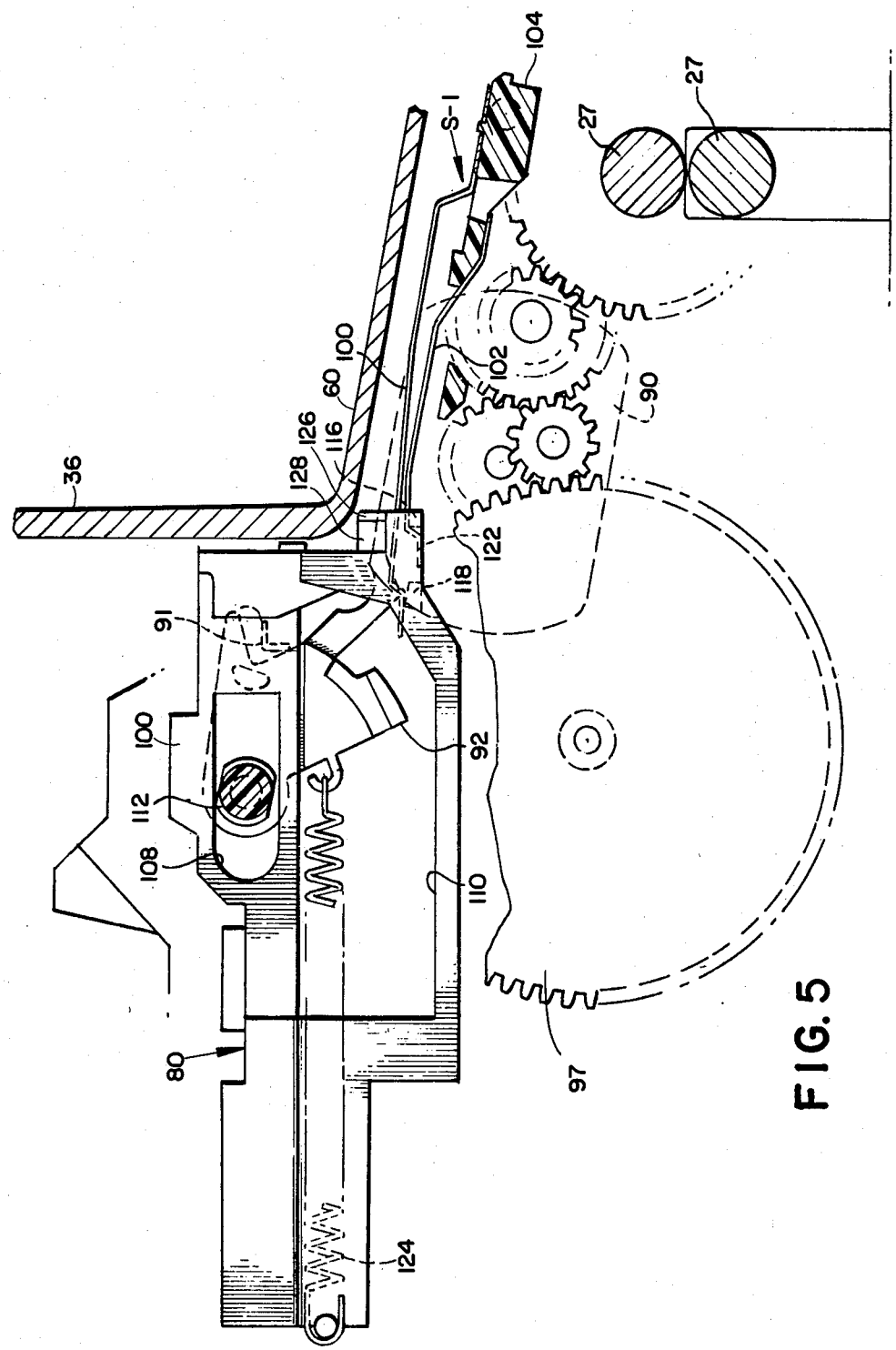
FIG. 5 is a right-side elevational view of selected components within the camera showing how the slider maintains as S1 switch in its open condition when the slider is located in its first or ready position.

Referring to FIGS. 1 and 2 of the drawings, the improved camera, 10 embodying the present invention includes an electronic flash unit 12 mounted on camera housing 14 for movement between an erect operative position shown in FIG. 1 and a folded inoperative storage position shown in FIG. 2.

The improvements herein are directed to a mechanical dual actuator system for charging a storage capacitor in flash unit 12 and initiating an automatic cycle of camera operation including film exposure. Components of this system include a flash charge switch actuator 16, a slider actuator 18, and a projection or detent 20 on the flash unit 12 for mechanically latching the switch actuator 16 when the flash unit 12 is in its folded position.

Camera 10 is of the self-developing type and is preferably configured for use with a film pack 21 (see FIG. 6) that includes a stack of "integral" self-developing film units and a flat electrical battery for powering the camera's electrical system including a circuit for charging flash unit 12. For a representative example of such a film pack, see commonly assigned U.S. Pat. No. 3,877,045.

Camera housing 14 includes a bottom base section 22 having a chamber therein for receiving such a film pack 21 to locate the forwardmost film unit therein at the camera's focal plane. Extending forwardly of section 22 is a pivotally mounted loading door section 24. Upon manual actuation of slide latch 26, section 24 may be pivoted downwardly to provide access to an open end of the receiving chamber. Section 24 also mounts a pair of motor driven pressure-applying rollers 27 and locates the bite line of the rollers in alignment with a film pack withdrawal slot 28 when section 24 is closed (see FIG. 6). After exposure, the forwardmost film unit in the pack is advanced between the rollers for processing in a well-known manner and then through an elongated laterally extending film exit slot 29 on the front wall of section 24 to the exterior of camera 10.

Positioned over the forward end of base section 22 is an upstanding box-like shutter housing section 30 for housing a majority of the camera's exposure control components. Behind shutter housing section 30 is an exposure chamber defining housing section 32 having a downwardly sloping rear wall 34 positioned over an inclined mirror in the exposure chamber, that defines part of a reflex or folded exposure optical path to the camera's focal plane.

Shutter housing section 30 is defined by a plurality of generally planar walls including forward wall 36, top wall 38, a pair of oppositely spaced lateral side walls 40 and 42, and a rear wall 44 joining housing section 32. In a preferred embodiment shutter housing section 30 also includes a longitudinally extending actuator housing 46 integrally formed with and extending outwardly from the lower portion of side wall 40. Actuator housing 46 will be described in detail later.

Forward wall 36 is provided with a plurality of access openings therein for exposure control components mounted on or in housing section 30 and including an adjustable focus objective lens 48; a front lens 50 of a Galilean-type viewfinder; a window 52 below lens 50 for admitting scene light to a photocell forming part of the automatic exposure control system; and an optional sonic transducer 54 forming part of an optional automatic lens focusing system. As best shown in FIG. 2, the viewfinder includes a rearwardly extending viewfinder tube 56 that communicates with front lens 50 and mounts a rear lens at the trailing end thereof.

Extending forwardly from the lower portion of forward wall 36, over the top of the closed loading door section 24, is an apron housing section 58 for covering certain camera components including an electrical motor for driving the pressure-applying rollers, a film advance mechanism, and a later-to-be-described timing or sequencing wheel. Apron housing section 58 is defined by a plurality of generally planar walls including an upper apron wall 60, a pair of oppositely spaced depending lateral side walls 62 and 64, and a leading end wall 66. It will be noted that the apron side walls 62 and 64 lie in imaginary planes that contain their corresponding side walls 40 and 42 of shutter housing section 30. Also provided on apron housing section 58 is a recess or longitudinally extending switch actuator guide channel 68 for slidably receiving and guiding the movement of a portion of switch actuator 16 that is accessible on the exterior of camera housing 14. Recess 68 is located in apron upper wall 60 adjacent the intersection of forward wall 36 and side wall 40 and extends down through apron side wall 62.

The flash unit 12 includes a box-like housing defined in part by a forward wall 70, having a light output window 72 thereon, and a pair of oppositely spaced side walls 74 having depending leg sections that are received in appropriate recessed sections 76 in the side walls 40 and 42 of shutter housing 30. The legs are coupled to housing 30 at pivot pins 78 for flash unit movement between the erect position of FIG. 1 where the flash output window 72 is positioned to direct light from flash unit 12 toward the field of view of objective lens 48 and the folded position of FIG. 2 wherein the major portion of flash unit 12 is located in a recess or notch defined by the forward wall 36 of shutter housing 30 and the forwardly extending apron upper wall 60. It will be noted that detent or projection 20 extends forwardly from the flash unit housing forward wall 70 at a lower corner or portion thereof that is positioned over the actuator guide channel 68 when flash unit 12 is in the folded or storage position.

Flash unit 12 is electrically connected to a flash charge and operating logic circuit in shutter housing 30 by means of a multiple wire cable in a cable connector cover 78 that depends from the rear wall of the flash housing and enters an opening in the top wall 38 of shutter housing section 30. For a more detailed description of the construction of flash unit 12 and detents provided for releasably maintaining it in its erect and folded positions, reference may be had to commonly-assigned copending application Ser. No. 054,598 filed on July 3, 1979.

The mechanisms and systems employed in camera 10 for effecting a complete automatic cycle of camera operation, including film exposure and its subsequent processing, are set forth in detail in commonly-assigned U.S. Pat. No. 4,040,072 issued to Bruce K. Johnson and George D. Whiteside on Aug. 2, 1977. The camera disclosed in that patent is actuated by the user manually pushing on a cycle start button that is accessible on the forward wall 36 of shutter housing section 30. The push button is attached directly to a mechanical slider mounted within housing section 30 for longitudinal movement along a first path of travel between an inoperative or first ready position and a second position where the slider is effective to operate an electrical switch that causes the camera's electrical control system to be energized from the battery in the film pack.

The present invention maintains the slider mechanism to initiate the automatic cycle of camera operation but eliminates the slider push button. Instead, the mechanical slider, numerically designated 80 in FIGS. 3–6, has been modified to be coupled to the slider actuator 18 that is mounted for movement in actuator housing 46 along a second path of travel that is offset from the slider's path of travel in substantially parallel relation thereto.

Camera 10 includes a solenoid operated shutter mechanism (not shown) of the type illustrated in detail in U.S. Pat. No. 4,040,072. The shutter mechanism includes a pair of overlapping shutter blades that are reciprocally driven by a pivoting walking beam mechanism between positions blocking and unblocking the exposure path through lens 48 to the focal plane via reflection from the inclined mirror. A solenoid attached to the walking beam drives the blades to the blocking position when energized. When the solenoid is not energized, a biasing spring drives the blades to the unblocking position. The blades are normally held in the blocking position against the bias of the opening spring by a mechanical shutter latching device.

Figure 10:
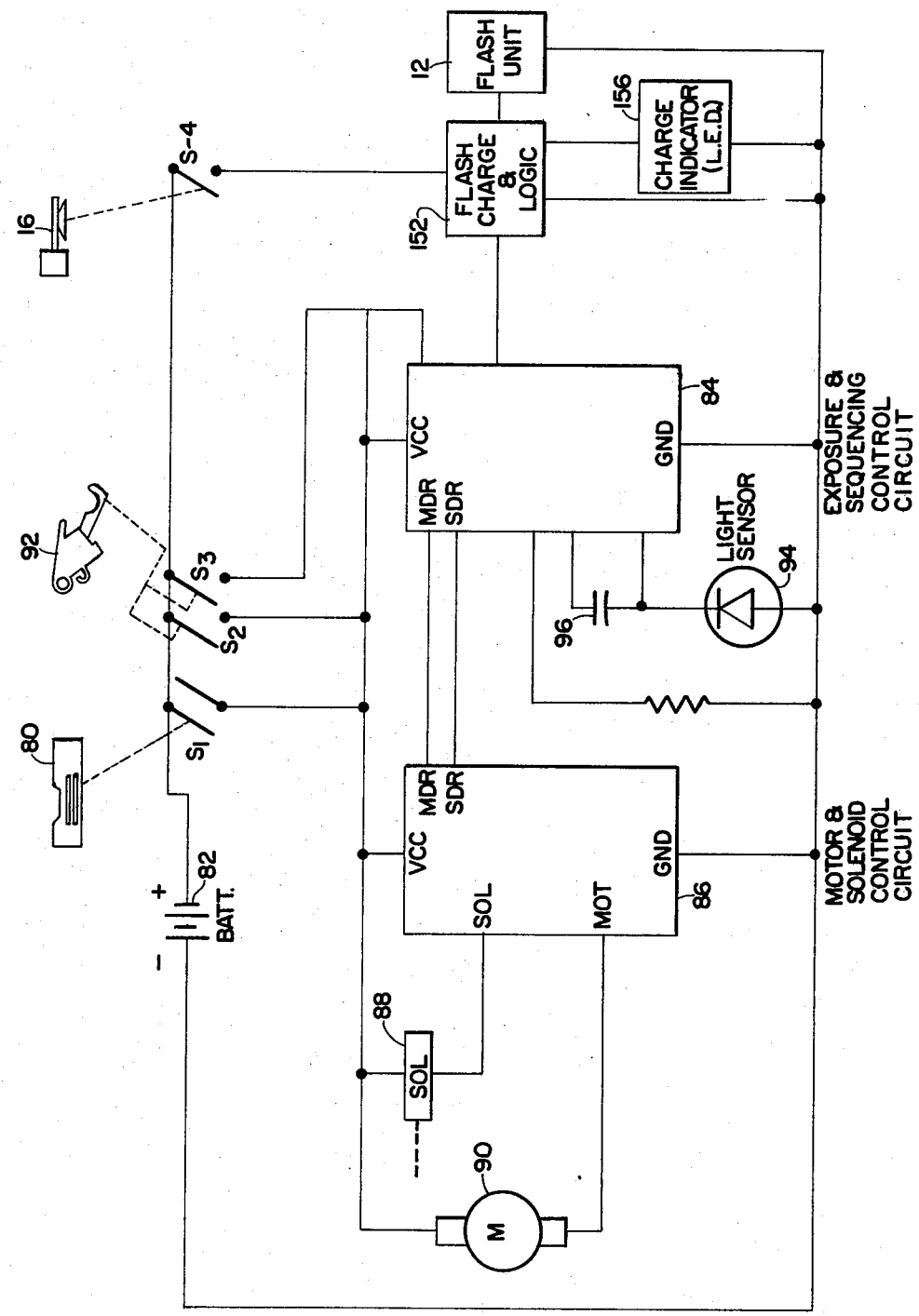
FIG. 10 is an electrical block diagram of the camera's electrical system showing the various electrical switches that are to be actuated to operate the camera.

As best shown in FIG. 10, movement of the slider 80 from its first position to its second position closes a normally opened switch S1 to electrically connect the electrical battery 82 to an exposure and sequencing control circuit 84 and a motor and solenoid control circuit 86 for operating shutter solenoid 88 and an electrical motor 90 for driving the processing rollers, film advance device and the camera sequencing wheel.

Figure 6:
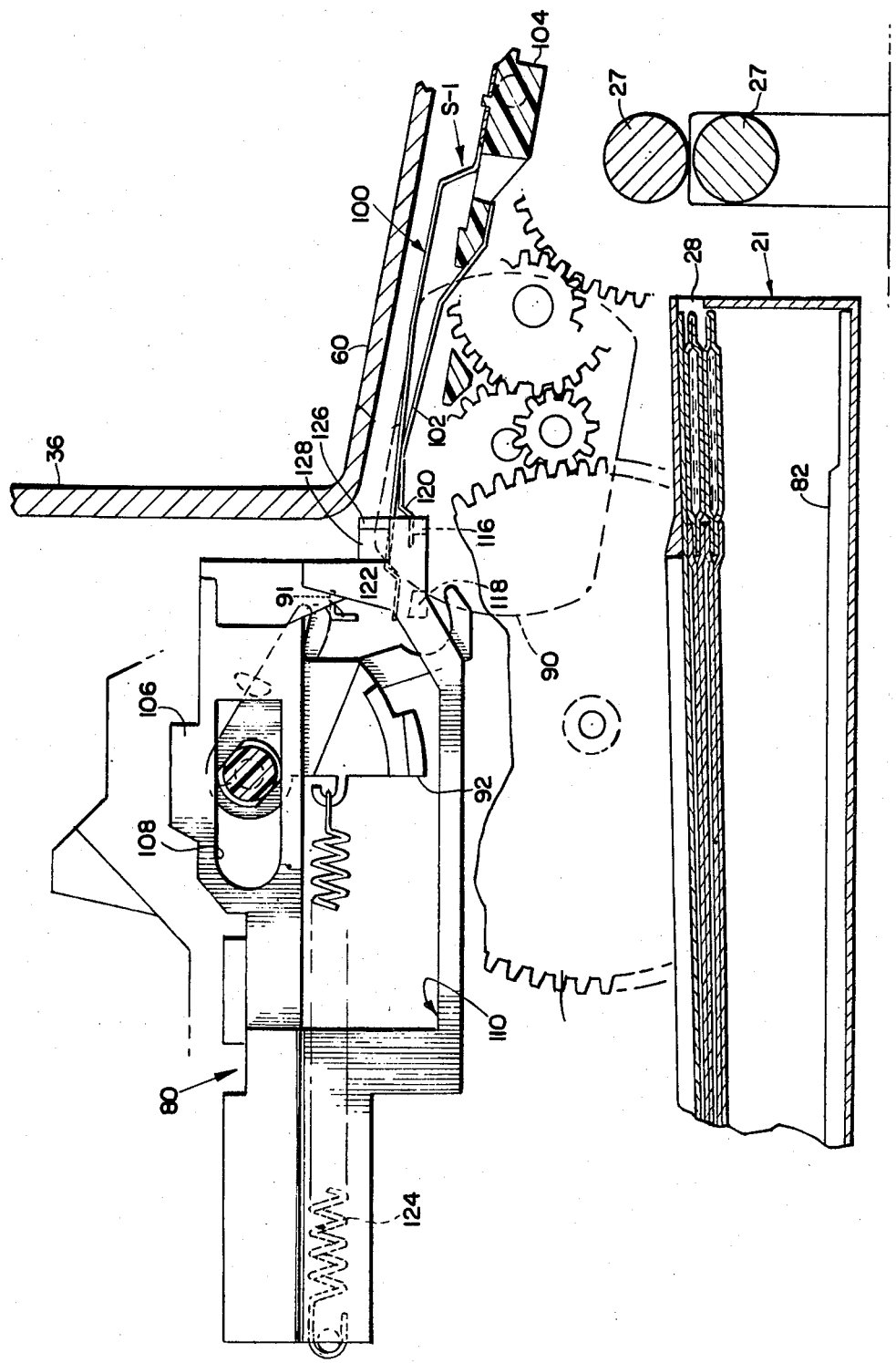
FIG. 6 is similar in some respects to FIG. 5 but shows the slider located in its second position for closing the S1 switch.

In response to operation of switch S1, the solenoid 88 is energized which pulls the blades slightly past the blocking position causing the release of the mechanical shutter latch designated 91 in FIGS. 5 and 6. At this point the solenoid is deenergized and the blades begin to open under the influence of the biasing spring to start the film exposure phase. The release of the shutter latch allows the counterclockwise pivotal movement of a switch actuator, designated 92 in FIGS. 5 and 6 of the drawings, resulting in the sequential operation or closing of normally open switches S2 and S3. S2 is a power latch switch which maintains electrical connection of battery 82 to circuits 84 and 86 thereby allowing the user to manually release the slider 80 and open S1 without interruption of the automatic cycle. S3 is designed to close just after S2 and to provide a logic input signal to circuit 84 from battery 82 to indicate commencement of the automatic exposure cycle.

As the shutter blades open, scene lighting conditions are monitored by a light integrating circuit including a light sensor or photocell 94 and its associated capacitor 96 connected in a well-known manner to provide a trigger signal or voltage indicative of the total quantity of scene light reaching the sensor on a time basis. Upon receipt of the trigger signal, circuits 84 and 86 operate to once again energize the solenoid 88 to close the shutter blades and thereby terminate the exposure phase. Following this, the motor 90 is operated to effect film processing and the drive of a sequencing wheel 97 having profile cams thereon (not shown) which causes the mechanisms to be reset, including the opening of switches S3 and S2 to end the automatic cycle of camera operation. For those wishing a more detailed description of the structure and operation of the various electrical components, identified herein for background purposes, reference may be had to the previously-noted U.S. Pat. No. 4,040,072.

Referring now to FIGS. 3, 5 and 6, the switches S1, S2 and S3 are preferably incorporated into a switch block 98 that is mounted in the apron housing section 58 adjacent to the charge switch actuator guide channel 68.

The S1 switch comprises a top elongated copper contact 100 and an underlying bottom copper contact 102 projecting rearwardly from the underside of an electrically insulating terminal board 104. The S2 and S3 switches comprise similar pairs of contacts that are somewhat shorter in total length. For visual clarity, only a portion of the top contacts of the switches S2 and S3 are shown in the drawing. A fourth switch on switch block 98 shown in FIG. 3 is associated with the ejection of a dark slide from the film pack but is not relevant to the understanding of the present invention and will not be described further.

The slider 80 is a multi-function piece part comprising a slender elongated molded plastic body 106 having an upper longitudinal opening 108 and a somewhat longer opening 100 therebelow. Upper opening 108 provides access for a pivot shaft 112 of switch actuator 92 to pass therethrough and also permits longitudinal movement of slider 80 between its first and second positions relative to shaft 112. The lower opening 110 is provided for cross-connecting members and other structural elements that are not relevant to the present invention but are more fully described in the previously-noted U.S. Pat. No. 4,040,072.

At the lower forward end of body 106 is an integrally molded L-shaped flange 114 having a forward laterally extending finger 116 and a longitudinally spaced laterally extending rear finger 118.

The trailing or free end of the top contact 100 of the S1 switch includes an offset or bent foot section 120. A similar foot section 122 is provided at the trailing end of the bottom contact 102.

When the slider 80 is located in its first or ready position, the foot section 120 of upper contact 100 rests on the rear finger 118 of the L-shaped flange 114 and the foot section 122 of contact 102 hooks over the forward finger 116 and occupies the space between fingers 116 and 118. As shown in FIG. 5, the upper and lower contacts 100 and 102 do not make contact when slider 80 is in this first position thereby maintaining the S1 switch in its off or nonconductive state. When slider 80 is moved rearwardly to its second position, the forward finger 116 lifts the lower contact 102 into conductive engagement with the upper contact 100 to close switch S1 (see FIG. 6). Upon the release of a rearward pushing force on slider 80, it moves from its second position back to its first position under the influence of a biasing spring such as the illustrated spring 124 coupled between the trailing end of slider body 106 and a trailing end hook on the S2, S3 switch actuator 92. This movement causes the fingers 116 and 118 to reset the contacts 100 and 102 to their open or nonconductive state.

Because the operation of the S2, S3 actuator 92 is not relevant to the understanding of the present invention, its structure and operation will not be described further herein. For the purpose of this disclosure, it is sufficient to note that rearward movement of the slider 80 effects the closing of the S1 switch and that it automatically returns to its first position to open the S1 switch under the influence of spring 124 when a rearward direction force is removed therefrom.

In the present invention, the slider 80 is coupled to the slider actuator 18 for movement thereby between the first and second positions. The means for coupling slider 80 and slider actuator 18 together include an integrally formed notched coupling flange 126 located on the forward end of slider body 106 above the L-shaped flange 114. As best shown in FIG. 3, flange 126 includes a V-shaped notch 128 for receiving a coupling tab 130 on slider actuator 18.

The slider actuator 18 comprises an offset or main body section 132 that is slidably mounted in actuator housing 46 along the offset and parallel second path of travel, and a coupling bridge section 134 preferably integrally formed with section 132 and extending laterally therefrom towards slider 80 where it terminates in the coupling tab 130 seated in notch 128.

The offset body section 132 is defined by a generally horizontal bottom wall 134, an outside vertical side wall 136 and a generally horizontal top wall 138 having bridge section 134 integrally formed therewith to extend inwardly from its inside edge.

These three longitudinally extending walls 134, 136 and 138 cooperate to define a three-sided guide channel for slidably receiving a later-to-be-described plunger section of the flash switch actuator 16 in telescoping relation thereto. It will be noted that the leading end of bottom wall 134 includes an integrally formed depending vertical tab 140 that serves as a push button surface should the user wish to operate the slider 80 by manually pushing rearwardly on slide actuator 18 to initiate a film exposure and processing cycle without first charging the flash unit 12.

Figure 7:
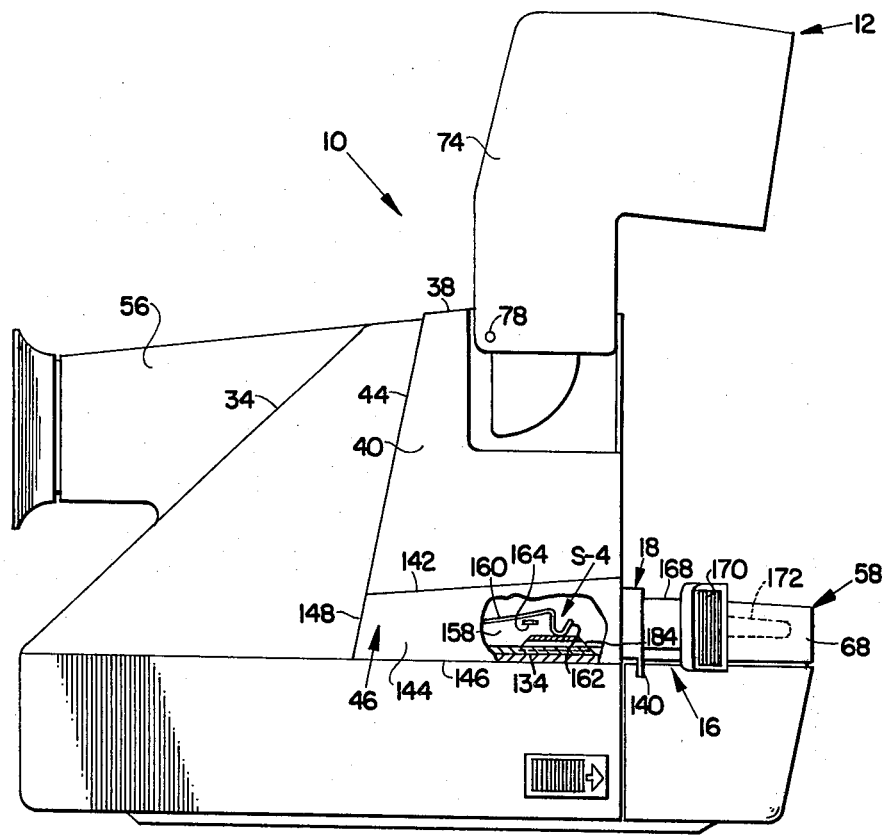
FIG. 7 is a side elevational view of the camera with a portion of an actuator housing cut away to show how the cam on the switch actuator maintains the flash charge switch in the open condition when the switch actuator is in its first position.
Figure 8:
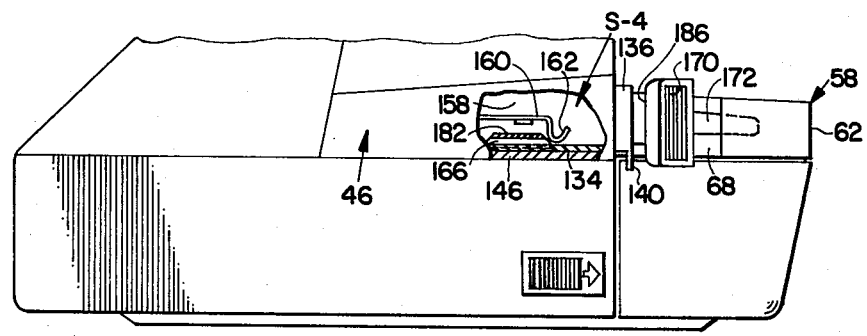
FIG. 8 shows a portion of the camera of FIG. 7 with the switch actuator in its second position with the cam displaced to close the flash charge switch.
Figure 9:
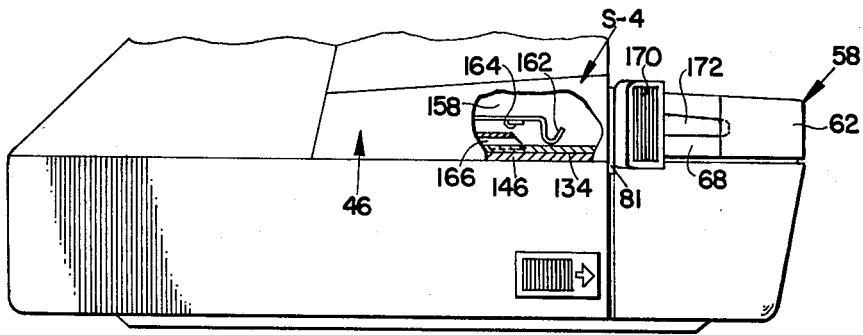
FIG. 9 shows the camera of FIG. 8 with the switch actuator moved to its third position and having moved therewith the slider actuator from its first or ready position to its second operative position to effect slider operation.

Referring to FIGS. 1 and 7, it will be seen that the elongated generally square bore actuator housing 46 is defined by a top wall 142, an outside vertically disposed side wall 144, a bottom wall 146 and a trailing end wall 148. Thus the conforming interior surfaces of actuator housing 46 define a guide channel for slidably receiving the offset main body portion 132 through a forward end opening 150 of housing 46. As shown in FIGS. 1, 7 and 8, the forward end of body section 132, including push button surface 140, extends outwardly through the forward end opening 150 and slightly therebeyond when the slider actuator 18 is operatively coupled to the slider 80 located in its forwardmost first or ready position to maintain the S1 switch in its opened condition. By pushing slider actuator 18 rearwardly, further into actuator housing 46 along the second path of travel, the slider 80 coupled thereto is automatically moved rearwardly from its first position to its second position to effect actuation of the S1 switch. The rearward terminal position of slider actuator 18 is shown in FIG. 9 of the drawings with the backside of tab 140 in engagement with the forward edge of bottom wall 146. Upon release of the rearward pressure on slider actuator 18, it is automatically moved forwardly by the slider 80 which returns to its first position under the influence of return spring 124.

Referring to FIG. 10, the flash unit 12 is of the gaseous discharge strobe type with quenching circuitry to cut off light output upon receipt of a proper termination signal. Because of the quench capability it is intended that the normal operating cycle of camera 10 will include the charging of flash unit 12 and its firing during the film exposure phase. In low ambient light situations, flash unit 12 will provide the majority of illumination needed to properly illuminate the subject or scene. In daylight or higher ambient light photographic situations, flash unit 12 will operate for a relatively short time, under the control of the light sensing photocell circuit, and provide a fill flash capability for softening facial shadows, or reducing the harshness of high contrast subject matter.

Camera 10 is provided with a flash charge and operating logic circuit 152 that is adapted to be electrically connected to the battery 82 upon the closing of a normally open flash charge switch S4.

Circuit 152 is electrically connected to the exposure and sequencing control circuit 84, flash unit 12, and a flash charge state indicator circuit 156 which includes an indicator such as a light-emitting diode which may be seen by the user as he looks through the viewfinder to indicate the state of charge of the capacitor in flash unit 12.

Thus a normal cycle of operation of camera 10 is initiated by the sequential actuation of S4 to charge flash unit 12 and then S1 to begin the automatic cycle of camera operation.

Upon the initial closing of S4, circuit 152 charges the storage capacitor in flash unit 12 while monitoring the state of charge and providing a continuously updated indicator signal to circuit 156. During the exposure phase, circuit 152 feeds the appropriate flash fire and quench signals provided by exposure and sequencing control circuit 84 to flash unit 12.

Referring to FIGS. 7-9, the S4 switch is mounted on an internal side wall member 158 in shutter housing section 30 longitudinally disposed between the slider 80 and the open inner side of actuator housing 46. Although not shown in the drawing, side wall member 158 includes an access opening therein for the bridge section 134 to make the connection to the slider coupling flange 126.

The S4 switch comprises an elongated cantilever spring contact 160 having a rounded and depending foot section 162 at its free end, and a fixed contact 164 under the straight portion of contact 160. Spring contact 160 is normally biased so that it engages the lower contact 164 as best shown in FIGS. 8 and 9 to render the S4 switch conductive.

With reference to FIGS. 3 and 4, the S4 switch is configured to be operated by the flash charge switch actuator 16 and more specifically by a switch operating cam 166 thereon.

Actuator 16 is preferably a molded plastic piece part comprising an elongated plunger section 168 having a generally square cross-section, a push button section 170 at the forward end of plunger section 168, a coupling tab 172 extending forwardly of button section 170, a latch pedestal 174 extending rearwardly behind button section 170 on plunger section 168 and having an integrally formed recess or V-shaped notch 176 for receiving the detent projection 20 on flash unit 12, the previously-mentioned switch operating cam 166 attached to the lower rear side wall of plunger section 168 and extending laterally therefrom to position it in operative relation with the foot 162 of spring contact 160, and a spring retaining post 178 extending rearwardly from the trailing end of plunger section 168 for capturing the forward end of an actuator biasing or return spring 180 located in actuator housing 46 with its trailing end in abutment against the interior surface of actuator housing trailing end wall 148.

As best shown in FIG. 4, that portion of actuator 16 behind button section 170 is adapted to be slidably received in the three-sided channel defined by the walls of slider actuator 18 located in actuator housing 46.

The flash charge switch actuator 16 is mounted for movement along the second path of travel from a first or inoperative position where cam 166 maintains the S4 switch in its open or nonconductive state to a second or intermediate position where the position of cam 166 causes the S4 switch to close to initiate the charging of the flash unit storage capacitor and then to a third position, beyond the second position, for actuating a cycle of camera operation by moving the slider actuator 18 rearwardly from its first position to its second position to operate slider 80 and close the S1 switch.

In the first or ready position, a forward portion of switch actuator 16, including button section 170 and that portion of the plunger section 168 that includes the latch pedestal 174, is located in the actuator guide channel 68 and is accessible from the exterior of camera housing 14. The rear portion of actuator 16, behind pedestal 174, is located within the channel of slider actuator 18 in the actuator housing 46. The forward end of switch actuator 16 is retained in channel 68 by means of the coupling tab 172 that extends through an access opening in the facing end wall of channel 68 and into the apron section in parallel sliding relation to the corresponding apron side wall 62. The biasing force to maintain actuator 16 in this first position is provided by the actuator return spring 180 located in the trailing end of actuator housing 46. When actuator 16 is located in this position, an upper raised flat face 182 of cam 166 is positioned under the bottom of foot 162 and raises the upper contact 160 above lower contact 164 so that switch S4 is in its nonconductive state.

In response to the user manually pushing actuator 16 rearwardly, the cam 166 slides under foot 162 which follows a downwardly inclined ramp surface 184 in front of cam face 182 thereby lowering the upper contact 160 to a point where it engages lower contact 164 and closes the S4 switch. The inclined ramp on the trailing end of cam 166 is provided for facilitating the insertion of actuator 16 into housing 46 and does not have a function in the operation of camera 10.

Thus in response to initial movement of switch actuator 16 from its first position shown in FIG. 7 to its second position shown in FIG. 8, it moves relative to the slider actuator 18 which remains in its first or ready position under the influence of the slider return spring 124. During manual movement of the switch actuator 16 from its second position shown in FIG. 8 to its third position shown in FIG. 9, the rearwardmost surface 186 of the button section 170 engages the leading end of the slider actuator 18 and moves it rearwardly therewith to effect movement of the slider 80 from its first position to its second position which results in the closing of the S1 switch to initiate the automatic cycle of camera operation.

If the user chooses to have the flash unit 12 operate during the exposure mode, he simply rests the thumb of his right hand on the trailing end wall 148 of actuator housing 46 and, with the second finger on button section 170, manually moves the switch actuator 16 rearwardly from the first position to the third position. This causes the flash unit to be charged when the S4 switch is closed so that flash unit 12 operates when the slider closes S1. However, the arrangement of the switch actuator 16 and the slider actuator 18 embodying the present invention provides the user with the option to eliminate the operation of the flash unit 12 in the automatic cycle of camera operation by bypassing the flash charge stage. In this instance, the user merely inserts his second finger between the button section 170 of actuator 16 and the forward end of slider actuator 18 and pushes rearwardly on the vertical depending tab 140 thereon to move actuator 18 rearwardly in housing 46 to operate the slider 80.

When switch actuator 16 is manually released from its second or third position, the return spring 180 pushes it forwardly and the cam 166 slides under the foot 162 of top contact 160 thereby raising the top contact 160 out of engagement with lower contact 164 to open the S4 switch.

When the switch actuator 16 is in its forwardmost first position the latching pedestal 174 and notch 176 thereon are located just forwardly of the lower surface of shutter housing forward wall 36. Upon moving the flash unit 12 to its folded storage position of FIG. 2, the detent or projection 20 thereon enters notch 176 and thereby effectively latches switch actuator 16 in its first or forwardmost position. This feature serves as a safety device to effectively prevent rearward movement of switch actuator 16 beyond its first position thereby inhibiting the charging of the flash unit and operation of the slider 80 to close the S1 switch.

While the detent 20 on the flash unit and the corresponding notch 176 on actuator 16 are utilized in the illustrated camera 10 to inhibit the initiation of charging the flash unit 12 when it is folded, this same arrangement may be used in other cameras to inhibit the first step in an automatic cycle of camera operation. For example, the S4 switch may be utilized in conjunction with a photocell circuit to provide the user with a reading of scene lighting conditions prior to the initiation of the exposure phase. In other cameras that have a reflex viewing system and an automatic focusing system, the S4 switch may be closed to initiate a preliminary lens focusing phase prior to the initiation of film exposure.

Those skilled in the art will appreciate that an alternative embodiment of the actuator latching system may include an upstanding projection on pedestal 174 and a corresponding detent in the form of a projection receiving recess on the forward wall 70 of the flash housing in place of projection 20.

Because certain changes may be made in the above-described improved camera without departing from the scope of the invention herein involved, it is intended that all matter contained in the above description or shown in the accompanying drawings shall be interpreted as illustrative and not in a limiting sense.

What is claimed is:

1. An improved camera having an electronic flash unit and including a camera housing, means operable upon actuation for initiating an automatic cycle of camera operation including film exposure, a slider within said housing movable between an inoperative first position and an operative second position wherein said slider actuates said cycle initiating means, means for normally biasing said slider toward said first position, and a charge control circuit, responsive to operation of a charge control switch within said camera housing and normally set in a noncharging state, for connecting the flash unit to a source of electrical power to charge the flash unit's storage capacitor so that said flash unit will operate during the automatic cycle of camera operation wherein the improvement comprises:

a slider actuator coupled to said slider and being mounted on said camera for movement from a first position to a second position for actuating said slider, said slider actuator including a push button portion accessible on the exterior of said camera housing for optionally effecting manual movement of said slider actuator to actuate said slider; and a normally operable charge switch actuator mounted on said camera for movement between an inoperative first position and sequential operative second and third positions, said charge switch actuator including a forward portion having a push button section that is accessible on the exterior of said camera housing for effecting manual movement of said charge switch actuator and a rearward portion extending into said camera housing and including a cam thereon for operating said charge control switch, said charge switch actuator and said slider actuator being cooperatively arranged so that in response to movement of said charge switch actuator from its first to its second position said cam switches said charge control switch to its charging state and in response to further movement from its second to its third position said charge switch actuator engages and moves said slider actuator from its first to its second position to effect sequential operation whereby said flash unit is charged before an automatic cycle of camera operation is initiated, said charge switch actuator and said slider actuator also being cooperatively arranged to allow independent manual operation of said slider actuator thereby providing the user with the option of bypassing the flash charge phase by not operating said charge switch actuator and manually initiating an automatic cycle of camera operation that does not include operation of said flash unit.

2. The improved camera of claim 1 wherein said charge switch actuator and said slider actuator are arranged in telescoping relation with said push button portion of said slider actuator being spaced rearwardly from said push button section of said charge switch actuator to allow insertion of the user's finger therebetween and facilitate optional manual engagement and operation of said slider actuator.

3. The improved camera of claims 1 or 2 wherein said flash unit is mounted on said camera housing for movement between an erect operative position and a folded storage position and further includes a detent thereon which extends into the path of travel of a portion of said charge switch actuator when said flash unit is in said storage position for blocking movement of said charge switch actuator from its first to its second position to thereby inhibit inadvertent charging of the storage capacitor.

4. An improved camera having an electronic flash unit and including a camera housing, means operable upon actuation for initiating an automatic cycle of camera operation including film exposure, a slider within said housing and mounted for movement along a first path of travel between an inoperative first position and an operative second position where said slider actuates said cycle initiating means, means for normally biasing said slider toward said first position, and a charge control circuit, responsive to operation of a charge control switch, for electrically connecting the flash unit to a source of electrical power for charging the flash unit's storage capacitor so that the flash unit will operate during the automatic cycle of camera operation wherein the improvement comprises:

a manually operable charge switch actuator mounted on said housing for movement between an inoperative first position and sequential operative second and third positions all disposed along a second path of travel that is offset in substantially parallel relation to said slider first path of travel and extends from an exterior portion of said housing to an interior portion thereof adjacent to said slider, said switch actuator including a rearward portion having a switch actuating cam thereon extending into said housing and a forward portion including a button section manually accessible on the exterior of said housing;

means for biasing said switch actuator for automatic return to its said first position upon manual release;

means for mounting said charge control switch on the interior of said housing in position to be operated by said switch actuating cam in response to manual movement of said switch actuator from its said first to its said second position; and a slider actuator for moving said slider from said first position to said second position to initiate an automatic cycle of camera operation, said slider actuator being coupled to said slider for simultaneous movement therewith and including a body section extending into said second path of travel in position to be engaged and moved by said button section of said switch actuator to effect slider operation during manual movement of said switch actuator from its said second to its said third position to effect sequential operation whereby said flash unit is charged before the automatic cycle of operation is initiated, said slider actuator further including a push button portion accessible on the exterior of said housing and being spaced rearwardly from said push button section of said switch actuator, said slider actuator being mounted for manual movement, independent of movement by said switch actuator, in response to the user pushing on said push button portion to effect operation of said slider thereby providing the user with the option of bypassing the flash charge phase by not operating said switch actuator and manually initiating an automatic exposure cycle that does not include operation of said flash unit.

5. The improved camera of claim 4 wherein said body section of said slider actuator includes a channel for receiving at least a major portion of said rearward portion of said switch actuator therein in telescoping relation for movement relative to said body section as said switch actuator is moved between its first and second positions.

6. The improved camera of claim 4 wherein said flash unit is mounted on said camera housing for movement relative thereto between an erect operative position and a folded inoperative position where a portion of the flash unit is adjacent said forward portion of said switch actuator and further including a detent on said flash unit portion for blocking movement of said switch actuator from its first to its second position when said flash unit is in said folded position.

7. The improved camera of claim 4 wherein said camera housing is of the type including a shutter housing section including a forwardly facing front wall and a pair of oppositely spaced lateral side walls, and an apron section extending forwardly from a bottom portion of said forward wall and including an upper apron wall and a pair of oppositely spaced apron side walls depending from lateral edges of said upper apron wall, said apron and shutter housing side walls being substantially planar with corresponding apron and shutter housing side walls lying in common imaginary planes and wherein said improvement further includes means for defining a guide channel recess in said apron section extending through one of said apron side walls and a portion of said upper apron wall adjacent thereto for slidably receiving at least a part of said forward portion of said switch actuator and means for defining an elongated actuator housing section on said corresponding shutter housing side wall in offset relation with said channel recess for slidably receiving said rearward portion of said switch actuator and at least a major portion of said body section of said slider actuator.

8. The improved camera of claim 7 wherein said actuator housing has an open forward end for admitting said rearward portion of said switch actuator and said major portion of said body section and an opposite trailing end closed by a trailing end wall and said switch actuator biasing means includes a biasing spring located in said actuator housing with one of its ends in engagement with said trailing end wall and its opposite end in engagement with a trailing end section of the switch actuator's rearward portion to provide a biasing force thereon toward said first position of said switch actuator.

9. The improved camera of claim 8 wherein the exterior surface of said trailing end wall is a thumb rest surface for facilitating the manual movement of said button section of said switch actuator toward its said second and third positions with the second finger of the user's hand.

* * * * *